United States Patent [19]

Ensign

[11] 4,176,687

[45] Dec. 4, 1979

[54] HOLLOW SPOOL VALVE

[75] Inventor: Harold W. Ensign, Fullerton, Calif.

[73] Assignee: Cla-Val Co., Costa Mesa, Calif.

[21] Appl. No.: 827,628

[22] Filed: Aug. 25, 1977

[51] Int. Cl.² .................... F15B 13/044; F16K 31/04
[52] U.S. Cl. .......................... 137/625.65; 137/625.27;
137/625.5; 251/80; 251/134; 251/263; 251/282
[58] Field of Search ........... 137/625.27, 625.5, 625.65;
251/80, 134, 263, 282

[56] References Cited

U.S. PATENT DOCUMENTS

| | | |
|---|---|---|
| 775,017 | 11/1904 | Waterman . |
| 775,054 | 11/1904 | Waterman . |
| 959,609 | 5/1910 | Roehrich . |
| 1,713,402 | 5/1929 | Shivers . |
| 1,903,229 | 3/1933 | Colman et al. .................. 251/263 X |
| 1,933,713 | 11/1933 | Cummings . |
| 1,989,942 | 2/1935 | Parks et al. |
| 2,277,573 | 3/1942 | Wichorek . |
| 2,280,062 | 4/1942 | Craig . |
| 2,404,514 | 7/1946 | McClure . |
| 2,503,563 | 4/1950 | Ray . |
| 2,527,851 | 10/1950 | Ray . |
| 2,536,691 | 1/1951 | Miller et al. |
| 2,723,681 | 11/1955 | MacGlashan et al. |
| 2,734,770 | 2/1956 | Kurata . |
| 2,780,433 | 2/1957 | Fleming . |
| 2,833,508 | 5/1958 | Bydalek et al. |
| 2,910,089 | 10/1959 | Yarber . |
| 2,989,758 | 6/1961 | Turek et al. |
| 2,989,988 | 6/1961 | Rudelick . |
| 3,015,963 | 1/1962 | Terry . |
| 3,229,721 | 1/1966 | Bingel ................................... 251/80 |
| 3,324,889 | 6/1967 | Batts . |
| 3,339,586 | 9/1967 | Tenkku et al. |
| 3,359,998 | 12/1967 | Fike . |
| 3,460,614 | 8/1969 | Burgess ........................... 137/596.18 |
| 3,548,877 | 12/1970 | Aumayer ......................... 137/625.65 |
| 3,550,631 | 12/1970 | Vanderlaan et al. |
| 3,613,733 | 10/1971 | Machek . |
| 3,741,248 | 6/1973 | Stevens, Jr. |
| 3,848,637 | 11/1974 | Wilson ............................. 137/625.27 |
| 3,921,660 | 11/1975 | Kowalski ..................... 137/625.27 X |
| 3,957,079 | 5/1976 | Whiteman ........................ 137/596.18 |
| 4,011,892 | 3/1977 | Kowalski ..................... 137/625.27 X |

Primary Examiner—Gerald A. Michalsky
Attorney, Agent, or Firm—Gausewitz, Carr & Rothenberg

[57] ABSTRACT

A high capacity direct acting three-way bistable power operated valve is connected to control operation of an hydraulically operated magazine sprinkler control valve. The three-way bistable valve controls application of high pressure sea water and includes a slidable hollow valve spool having one end that is selectively seated upon and sealed against a valve seat in an inlet chamber, and having an intermediate spool portion connected to a common valve port. The other end of the hollow spool extends into an outlet chamber and is sealed against a valve seat therein when the first end of the spool is displaced from its valve seat and vice versa. Input pressure on the spool can be completely balanced or arranged to enhance sealing of the spool. The valve spool is axially shifted and latched either by a motor operated cam circuit arrangement or by driving and unlatching solenoids.

23 Claims, 10 Drawing Figures

U.S. Patent  Dec. 4, 1979  Sheet 1 of 4  4,176,687
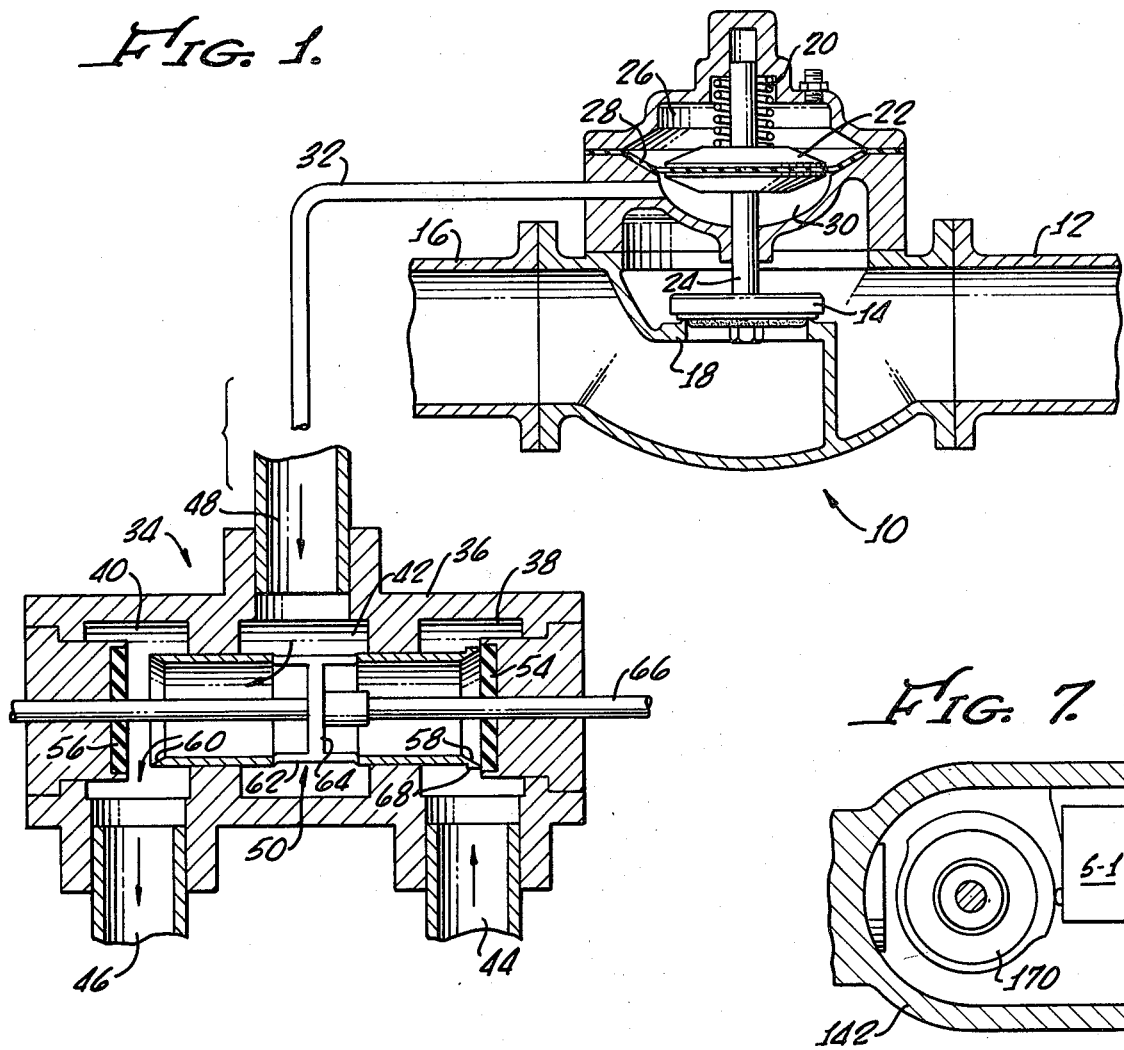
FIG. 1.
FIG. 7.
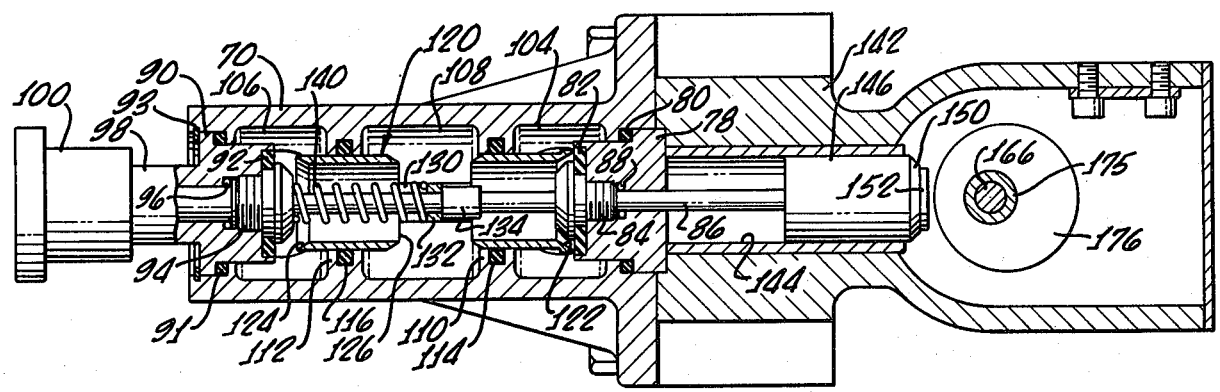
FIG. 6.

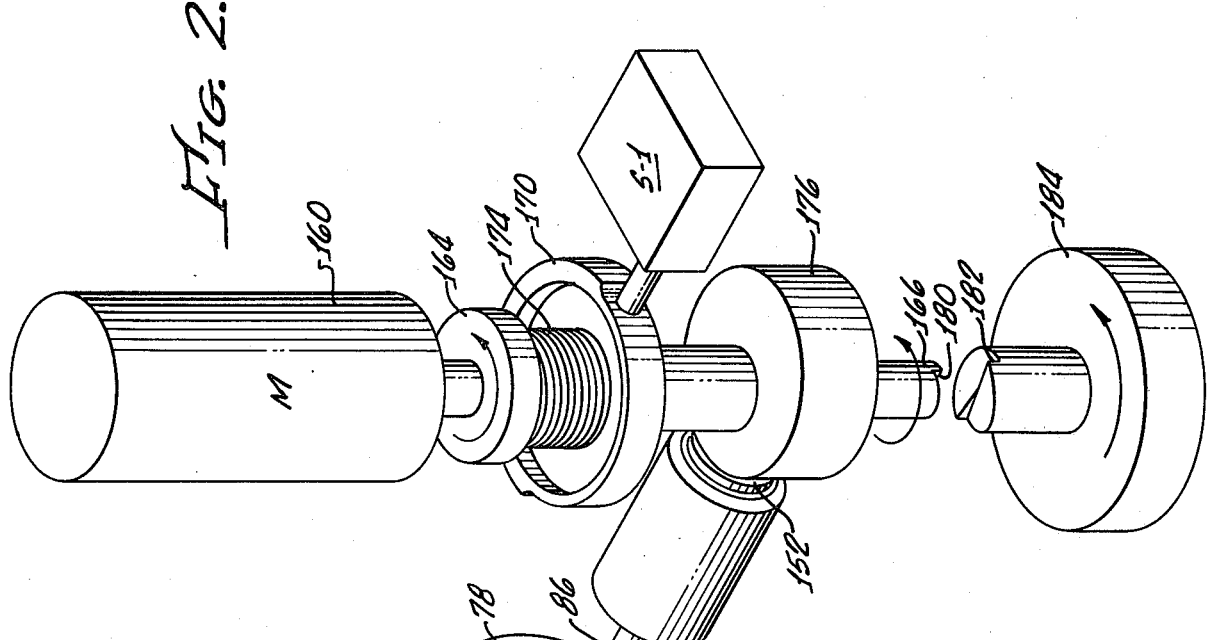
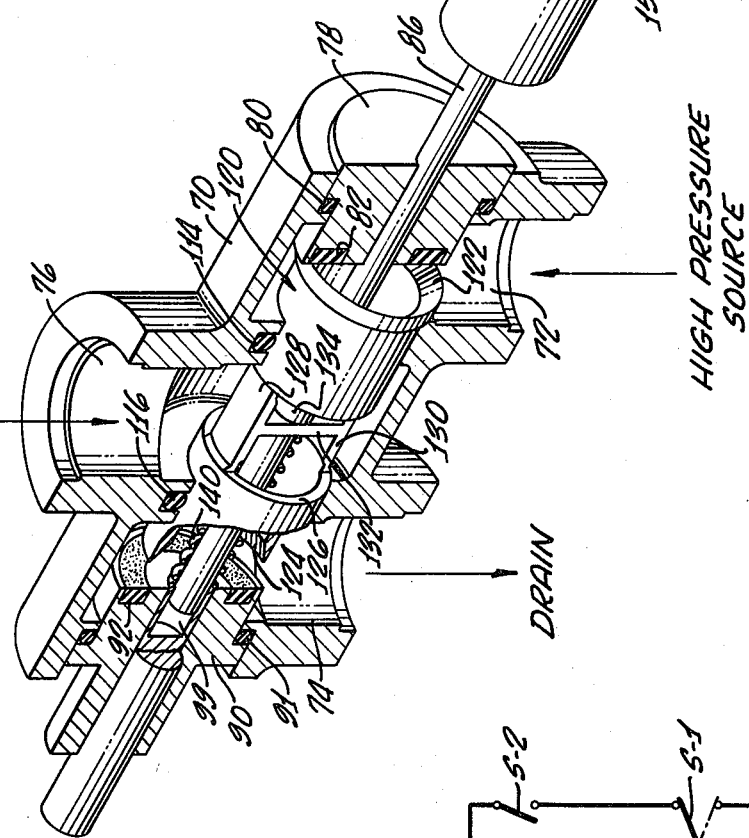

HOLLOW SPOOL VALVE

BACKGROUND OF THE INVENTION

Shipboard magazine sprinkler systems employ hydraulically actuated control valves that are required to open rapidly, in less than one second, in the event of a fire in the magazine. Such control valves, which may be eight inches or more in diameter, employ high capacity three-way power operated valves for their actuation. Preferably the actuating valves are direct acting, since pilot operated valves add unnecessary complexity and are too slow. Thus a direct acting valve is required for actuation of the large hydraulically controlled sprinkler control valve. The valve must have a high capacity for rapid actuation of the sprinkler control valve. It must be capable of sealing against high sea water pressures, in the order of 250 pounds per square inch, without leaking, and yet it must be capable of remote power operation by power units of reasonable size. For example, for a conventional three quarter inch diameter valve to be able to open against 250 pounds per square inches of pressure, an opening force of approximately 110 pounds is required. Such a large force is not available from a conveniently sized solenoid without an unacceptably large current flow.

The conventional spool valve in which flow passes about decreased diameter portions of the spool has a relatively limited capacity for its size because of the flow restriction imposed by the spool itself. Further, such spool valves require a relatively large number of sliding seals, which seals are subject to being pinched, abraded and torn as the spool and seals move into and out of valve ports or relieved areas of the spool. Thus it would be desirable for improved valve operation to increase the flow capacity, to decrease the number of O-rings or seals, and to provide a configuration that increases the life of the seals.

Applicant is unaware of any presently existing valve that would meet such requirements.

Accordingly, it is an object of the present invention to provide a valve that eliminates or minimizes disadvantages of prior valves and provides a rapid high capacity flow in a substantially balanced arrangement. Although the embodiments of the valve disclosed herein are specifically designed for actuation of magazine sprinkler control valves, principles of the present invention may be employed in many different types of valves, whether or not bistable or three-way, and in many different configurations and applications as will become apparent to those skilled in the art.

SUMMARY OF THE INVENTION

In carrying out principles of the present invention, in accordance with a preferred embodiment thereof, a valve body having a chamber with first and second ports, has a valve seat in the chamber and a hollow spool is slidably mounted to extend into the chamber through the second port so that an end of the spool may seat and seal upon the valve seat to block flow through the spool or may be displaced from the valve seat to permit flow between the chamber and the interior of the spool. For application as a three-way valve, the valve body includes second and third chambers with the other end of the hollow spool being slidably mounted through a port in the third chamber which has a valve seat upon which the spool is adapted to seat and seal in a second position of the spool. The third chamber is connected to the interior of the spool at an intermediate portion of the latter and both the second and third chambers have additional ports for communication with the exterior of the valve body in such application. Although a basically balanced arrangement is provided, so that input fluid pressure provides minimal resistance to shifting of the valve spool from its closed position, if desired the spool is readily provided with an enlarged exterior dimension adjacent one end in order to utilize input pressure to enhance the sealing of the spool end upon the valve seat.

For bistable operation of the valve, the spool is resiliently urged to a first position and a motor operated cam operates the valve to a second position wherein it is held until released. Alternatively, the spool may be driven to its second position and latched therein by means of a driving solenoid and a latch, with return to the first position of the spool achieved by means of a spring upon actuation of an unlatching solenoid.

BRIEF DESCRIPTION OF THE DRAWINGS

FIG. 1 illustrates a simplified valve embodying principles of the present invention connected with an hydraulic control valve of the type that may be employed for magazine sprinkler control;

FIG. 2 is a pictorial illustration, with parts omitted and parts broken away, of the actuating valve of FIG. 1, together with a motorized cam operator therefor;

FIG. 3 is a circuit diagram of an exemplary circuit for control of the valve operating motor;

FIG. 6 is a section taken on lines 6—6 of FIG. 4;

FIG. 7 is a section taken on lines 7—7 of FIG. 4;

DETAILED DESCRIPTION

Figure 4:
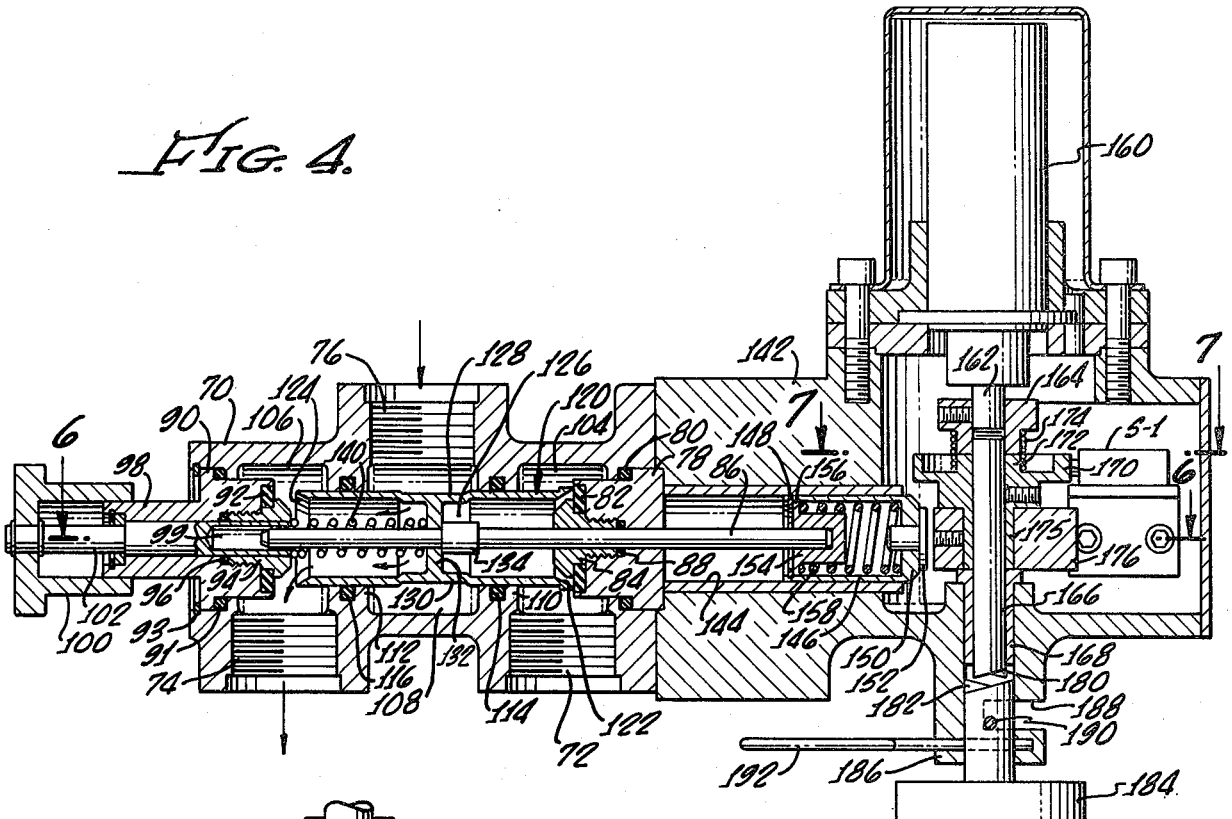
FIG. 4 is a sectional view of a preferred embodiment of the actuator valve of FIG. 1 in closed position.
Figure 8:
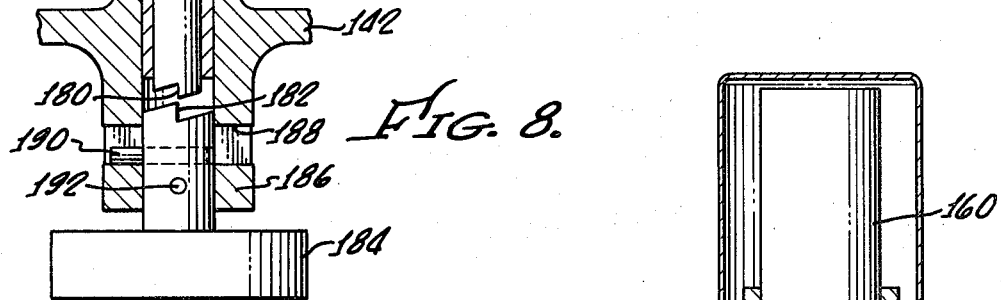
FIG. 8 shows a detail of the alternate manual drive for the valve.

As shown in FIG. 1, an hydraulically controlled valve 10 is arranged to flow fluid, such as sea water, from a pump (not shown) through an inlet pipe 12 past a movable valve closure 14 and thence through an outlet pipe 16 to apparatus that uses the water, such as for example a sprinkler system of an explosive or armament magazine. Valve 10 is normally held closed by seating of the closure member 14 upon a valve seat 18 in response to pressure of a spring 20 that presses upon a flexible diaphragm supported disc 22 connected to the closure 14 by means of a valve stem 24. Valves of this general type include a series of automatic valves known as the Clayton 100 P Powertrol Valves manufactured by Cla-Val Co. of Newport Beach, California, the assignee of the present invention. Similar valves employed in antisurge pumping systems are described in U.S. Pat. Nos. 2,384,420 and 3,957,395.

Closing of the valve 10 is achieved by the spring 20 and/or control of pressure within a chamber 26 defined in part by a valve diaphragm 28. Opening of the valve is achieved by increasing the pressure in a lower chamber 30 which tends to raise the disc 22, stem 24 and closure member 14. Increased pressurization of chamber 30 is achieved by means of pressurized fluid, such as sea water, for example, flowing into the chamber 30 through a conduit 32 from an actuating valve 34. Valve 34, in this disclosure, embodies principles of the present invention.

As indicated above, the purpose of actuating valve 34 is to provide a high volume, high pressure flow to the hydraulic control valve 10 in a very short period of time. It must withstand the very high input pressure and yet be capable of opening upon exertion of a relatively small force. In addition, to allow the valve 10 to be closed, actuating valve 34 must provide means to drain operating chamber 30 of the hydraulic control valve.

Actuating valve 34 is illustrated in FIG. 1 in schematic form and basically comprises a valve body 36, having an inlet chamber 38, a drain chamber 40 and a common chamber 42. Chambers 38, 40 and 42 are respectively provided with external ports 44, 46 and 48, respectively connected to a source of input fluid, a drain and the actuator valve output conduit 32. To provide selective and alternative communication between the common chamber 42 and the inlet or outlet chambers, there is provided a hollow spool 50 slidably and sealingly mounted for longitudinal motion along its axis through internal ports formed in the valve body. The internal ports connect the inlet chamber 38 with the common chamber 42 and the drain chamber 40 with the common chamber 42. Sealing of the spool in the internal ports prevents flow therethrough between the valve body and the exterior of the spool so that fluid flow through the internal ports can take place only through the interior of the spool. The inlet and drain chambers are provided at the ends thereof with axially aligned, mutually opposed valve seats 54, 56 adapted to cooperate with edges of the ends 58, 60 of spool 50.

An intermediate portion of spool 50 is partially cut away, as at 62, to provide fluid communication between the interior of the spool and the common chamber 42 in all positions of the spool. A rigid cross member 54 is provided at the intermediate portion for connection to a guiding and actuating rod 66 that is manipulated in a manner to be described below in order to axially shift the spool 50 between a first position (shown in FIG. 1) in which the spool end 58 seats and seals upon the valve seat 54 while the spool end 60 is spaced from its corresponding valve seat 56, and a second position in which the relations are reversed so that the first end 58 is spaced from seat 54 and the opposite end 60 of the spool is seated and sealed upon the valve seat 56. In the position illustrated, flow from inlet chamber 38 to common chamber 42 is blocked by the seating of the spool end upon the valve seat 54, whereas flow between the common chamber 42 and drain chamber 40 is permitted through the interior of the spool past the end 56 of the spool and thence out through port 46 to a drain (not shown). The arrows show flow paths.

For operating the hydraulic control valve 10, spool 50 of the actuator valve 34 is shifted to the left, as viewed in FIG. 1, so that end 60 seats upon valve seat 56 and end 58 is spaced from its valve seat 54. In this position fluid under pressure may flow through inlet port 44, through inlet chamber 38, through the interior of the valve spool, thence through the cut away spool portion 62 to common chamber 42, through conduit 32, and into operating chamber 30. This lifts the valve stem 24 and opens hydraulic control valve 10.

In a typical magazine sprinkler application, spool 50 is normally in closed position, as illustrated in FIG. 1, and a pressure in the order of 250 pounds per square inch of sea water is applied via inlet port 44. A closing spring (not shown in FIG. 1) is employed to urge the spool 50 to the illustrated closed position. Even in the presence of very high inlet pressure only a relatively small force (that needed to overcome the force of the closing spring, to be described below) need be exerted upon the stem 66 to move the valve to open position. This is so because the spool end is radially spaced from the inlet chamber walls around its entire periphery, and the inlet fluid which fills inlet chamber 38 around the entire periphery of the spool 50 will normally exert only radially directed forces upon the spool. These forces are mutually balanced and exert no net radial or axial force upon the spool, provided that the spool end is of uniform external diameter or has an equivalent balanced configuration.

However, it is possible, that under exceedingly high input pressures, the seat 54, which may be a flexible or resilient material, will be somewhat compressed, thus creating a tendency for the input fluid to leak past the spool between the spool end 58 and the slightly compressed seat 54. In order to minimize this tendency to leak under high input pressure, the described hollow spool valve configuration is readily adapted for modification to employ a selected amount of the input pressure to enhance and increment forces that tend to hold the spool in the illustrated closed position. For this purpose, a portion of the end of the spool adjacent seat 50 is made with an increased external dimension. As shown in FIG. 1, end portion 68 has an increased diameter to form a shoulder that cooperates with the pressure within the inlet chamber 38 to exert a force (directed toward the right as seen in FIG. 1) that tends to retain the spool in the illustrated closed position. Although the desired increased dimension is most conveniently formed by a shoulder, as illustrated, other configurations such as tapers, flares and the like may be employed to provide the spool with a portion of increased external area for reaction to the input pressure.

Independently of the enlarged external spool portion, when the valve is in the open position (with end 58 spaced from seat 54), the pressure of fluid within the inlet chamber 38 acts upon the differential between the internal and the external areas of the spool presented thereto to urge the spool toward the left, as viewed in FIG. 1.

An exemplary mechanization of the actuator valve of FIG. 1, together with a motorized cam drive therefor, is shown in FIGS. 4–8. As illustrated in these figures, this mechanization comprises a valve body 70 having threaded inlet, drain and common ports 72, 74, 76, corresponding to external ports 44, 46 and 48 of FIG. 1, for connection with suitable fittings and conduits (not shown). The valve body is closed at one end by a bored inlet disc retainer 78, sealed to the body by an O-ring 80, and carrying on its inner end a valve seat 82. Valve seat 82 is retained by a seat plug 84, threaded into retainer 78 and bored to mate with the bore of retainer 78 to receive a valve operating stem 86. Valve stem 86 is sealed to the plug 84 and retainer 78 by means of an O-ring 88 seated at the end of the plug adjacent the retainer.

In a similar manner, the other end of valve body 70 is closed by a drain disc retainer 90 that carries a drain valve seat 92 held in place by a plug 94 threaded into retainer 90. Drain disc retainer 90 is sealed to the valve body by means of an O-ring 91 and held within the valve body by a snap ring 93. Plug 94 is bored to receive an end of valve operating stem 86 and a sealing O-ring 96 is provided at the end of plug 94.

Drain disc retainer 90 has an outwardly projecting extension 98 that slidably mounts an end cap 100 carrying a shaft 102 which projects through a central bore of extension 98 and has a blind aperture 99 for reception of and contact with an end of the valve operating stem 86. This provides an emergency manual valve closing operator.

The valve body is divided into inlet drain and common chambers 104, 106 and 108 by means of a pair of circumferential inwardly projecting ribs or walls 110, 112 that are mutually spaced from each other and are formed with circumferential recesses that receive spool sealing O-rings 114, 116. Ribs 110 and 112 in effect provide internal ports for the valve body. Rib 110 provides an exit port from the inlet chamber and an inlet port to the common chamber. Rib 112 provides an exit port from common chamber 108 and an entrance port into drain chamber 106. Of course, all flow through the internal ports is provided through the interior of the valve spool which is exteriorly sealed to the ribs 110, 112 by O-rings 114, 116.

The hollow spool in this embodiment takes the form of a valve sleeve 120 having a generally cylindrical form (FIG. 2) and the opposite ends thereof beveled to provide relatively sharp sealing edges (having a radius of 0.005 to 0.010 inches, for example) 122, 124 for seating upon and sealing against the respective valve seats 82, 92. As best seen in FIG. 2, a central portion of the valve sleeve is cut away, as indicated at 126, to leave relatively longitudinally extending and diametrically opposed narrow bridge members 128, 130 rigidly interconnecting the opposite ends of the sleeve. A rigid cross member 132 interconnects bridge members 128, 130 and bears against a collar 134 that is fixed to the valve stem 86.

Figure 5:
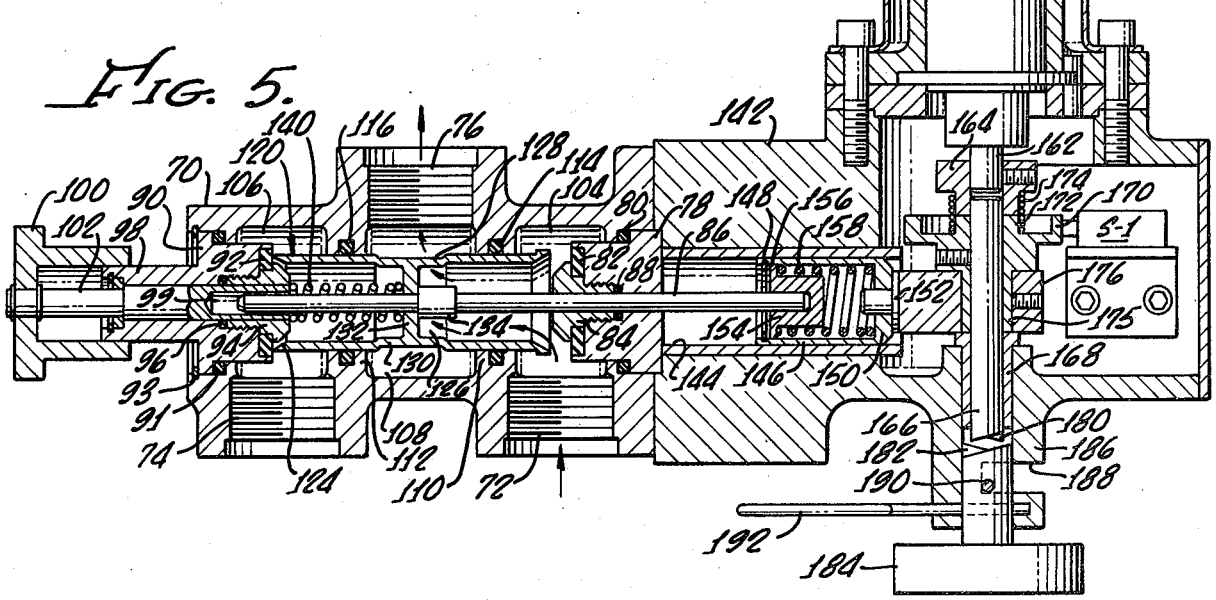
FIG. 5 shows the valve of FIG. 4 in open position.

A valve sleeve closing or return spring 140 circumscribes the valve stem 86 within the drain end of the sleeve, bearing at one end upon bridge member 132 and at the other end upon plug 94 (FIGS. 4, 5). Thus return spring 140, which is normally compressed, exerts a force upon the valve sleeve that tends to move it toward and retain it in the closed position illustrated in FIG. 4.

An operator housing body 142 is suitably fixed to one end of the valve body 70 and includes a bore 144 in which is mounted a lost motion spring housing 146 which, in effect, is the valve spool operator. Housing or spool operator 146 is slidably mounted in and axially of bore 144, and axially of the end of valve operator stem 86. The housing includes a driving end 150 carrying a cam follower bearing plate 152. Stem 86 has fixed to the end thereof a cap 154 that is held within housing 146 by a snap ring 148. Cap 154 has a peripheral flange 156 upon which is seated a lost motion spring 158 having its other end resting against housing end 150. Spring 158 is stronger than the return spring 140. The lost motion spring housing 146 may be moved toward the left relative to both housing body 142 and valve stem 86 while compressing spring 158. This lost motion arrangement compensates for tolerances and errors in various dimensions, including the dimensions of the driving cam to be described below.

Fixed to the valve operator body 142 is an electric motor 160 having an output shaft 162 fixedly carrying a clutch sleeve 164. A cam shaft 166 is mounted in a journal sleeve 168 carried in the valve operator body 142. Fixed to cam shaft 166 is a switch actuating cam 170 having a hub 172 that snugly receives one end of a helical clutch spring 174 of which the other end is snugly engaged about a depending hub portion of clutch sleeve 164. The arrangement is such that the clutch spring 174 will transmit to the cam 170 only a single direction of rotation of the motor 160 and further, the shaft 166 may be rotated without rotating the motor shaft or clutch sleeve.

Fixed to a depending sleeve 175 of the cam 170 is a driving cam 176 adapted to cooperate with the bearing plate 152 to drive the valve stem 86 and valve sleeve 120 toward the left from the closed position illustrated in FIG. 4.

The lower end of cam shaft 166 is formed with a plurality of inclined surfaces 180 that cooperate with similar inclined surface 182 on the innermost end of a manually operable handle 184 that is axially slidable in and also journalled in a depending section 186 of the valve operator body 142. Motor shaft 162, shaft 166 and handle 184 are all mutually coaxial in the disclosed embodiment although other arrangements may be employed. Section 186 is formed with a flot 188 (see also FIG. 8) that receives a limit pin 190 fixed in handle 184 and extending from one side thereof into the slot 188 to limit rotation of the handle 184 to 180 degrees. A removable safety pin 192 extends through the body section 186 and through the handle 184 (FIG. 5).

Switch cam 170 cooperates with a single pole double throw switch S-1 that is arranged to disable the power circuit of motor 160 upon completion of 180 degrees of rotation.

As shown in FIG. 3, motor 160 is energized from a suitable power source 194 via the normally closed cam operated switch S-1 and via a normally open condition sensing switch S-2. Upon occurrence of a condition to be sensed by this circuit, such as the elevated temperature of a fire in a magazine for example, condition sensitive switch S-2 closes to energize motor 160 and drive cam shaft 166 via clutch spring 174. Drive cam 176 is rotated to drive the lost motion spring housing to the left. Shifting of the housing 146 drives the stem 86 to the left, compressing return spring 140 to a relatively large degree while compressing the much stronger lost motion spring 158 to a relatively small or almost negligible degree initially. Thus, upon energization of the motor, the valve sleeve is shifted from the illustrated closed position to an open position in which water is caused to flow through the hollow valve sleeve to the hydraulic control valve which is operated thereby.

As cam shaft 166 attains a rotation of approximately 180 degrees, switch S-1 is actuated by cam 170 (FIGS. 3, 7) to the dotted line position of FIG. 3, to open the motor circuit. Thus the valve will remain in its second stable (open) condition.

It will be seen that the sleeve moves between two fixedly defined and limiting positions, bearing upon one or the other of the seats 82, 92 in closed and open positions. To insure proper positioning in both positions without impractically tight tolerances in dimensions of the sleeve, seat positions, driving cam and valve stem, and to insure proper seating in open position, the lost motion spring is provided. Thus after the sleeve reaches its open (limiting) position, the lost motion housing 146 continues to be driven by cam 176 a small additional distance to the left (as viewed in FIG. 5) by compression of the spring 158 which then moves relative to the valve sleeve instead of together with the sleeve. Upon completion of this last increment of cam motion, switch S-1 is operated to disable the motor.

To reset the valve, it is merely necessary to close reset switch S-3 to energize the motor through the power source 194 and the switch S-1 in its second position (illustrated in dotted lines in FIG. 3). The motor again rotates through 180 degrees, at which time the switch S-1 moves to its initial position (illustrated in full lines in FIG. 3) and, assuming sensor switch S-2 is now open, the motor stops and the valve remains in its initial stable (closed) condition.

Should the motor be inoperable for any reason, emergency operation can be achieved by the handle 184. Safety pin 192 is withdrawn, and the handle is pushed axially inwardly toward the cam shaft 166 and then rotated until further rotation is stopped by the stop pin 188, at which time the valve is in open position.

With the motor 160 driving the cam shaft 166 through the clutch spring 174 (in a counterclockwise direction for example, as viewed looking down upon the structure of FIG. 2), the clutch spring tends to tighten upon both the clutch sleeve and the cam shaft to thereby drive the shaft. If the motor has failed for any reason, a similar direction of rotation of handle 184 (in a counterclockwise direction as viewed looking downwardly upon the structure in the showing of FIG. 2), will again rotate the cam shaft 166 in a counterclockwise direction, but in this case the direction of spiral winding of the clutch spring maintains the spring loose upon the cam shaft and clutch sleeve to thereby allow the spring to slip upon the clutch sleeve. This drives only the cam shaft but not the motor. Inclined surfaces 180, 182 of the emergency manual drive comprises a one-way drive that will not interfere with driving of the shaft by the motor.

Figure 9:
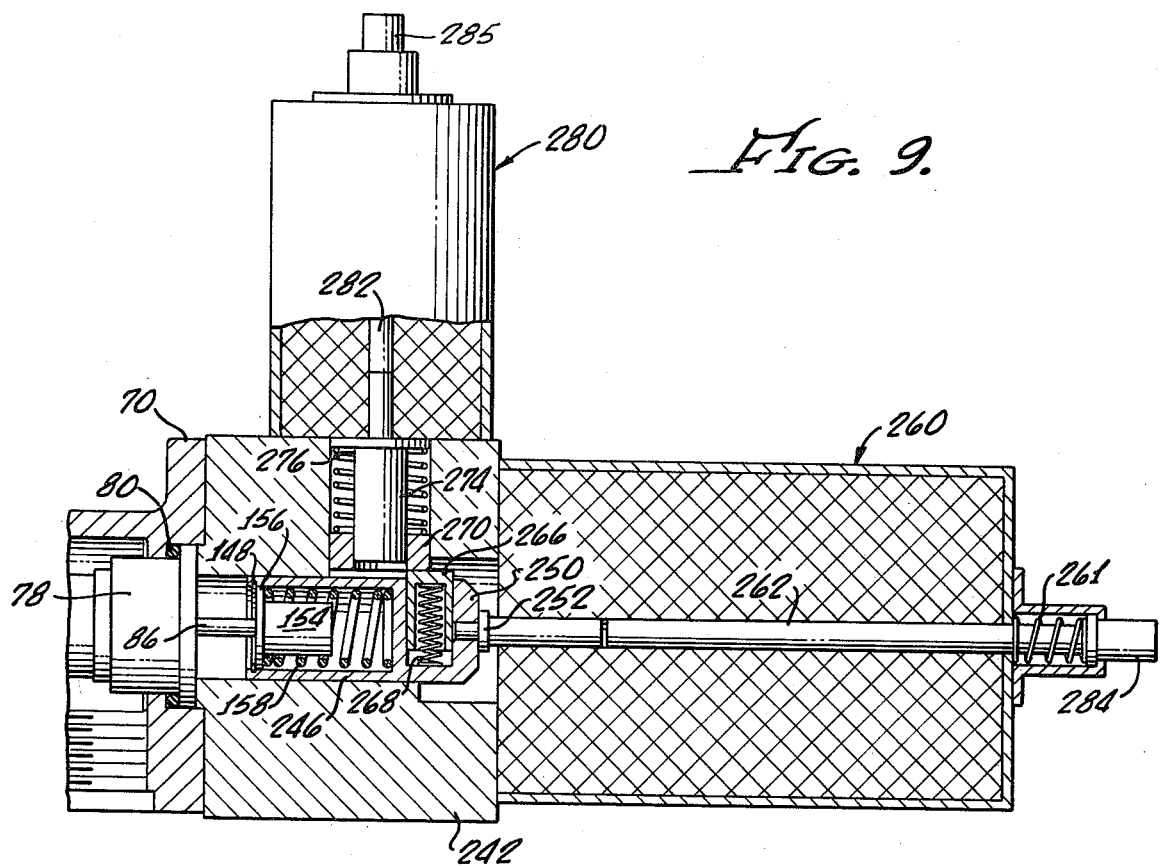
FIG. 9 shows a modification of the valve operator employing a driving solenoid and an unlatching solenoid, showing the valve in closed condition.
Figure 10:
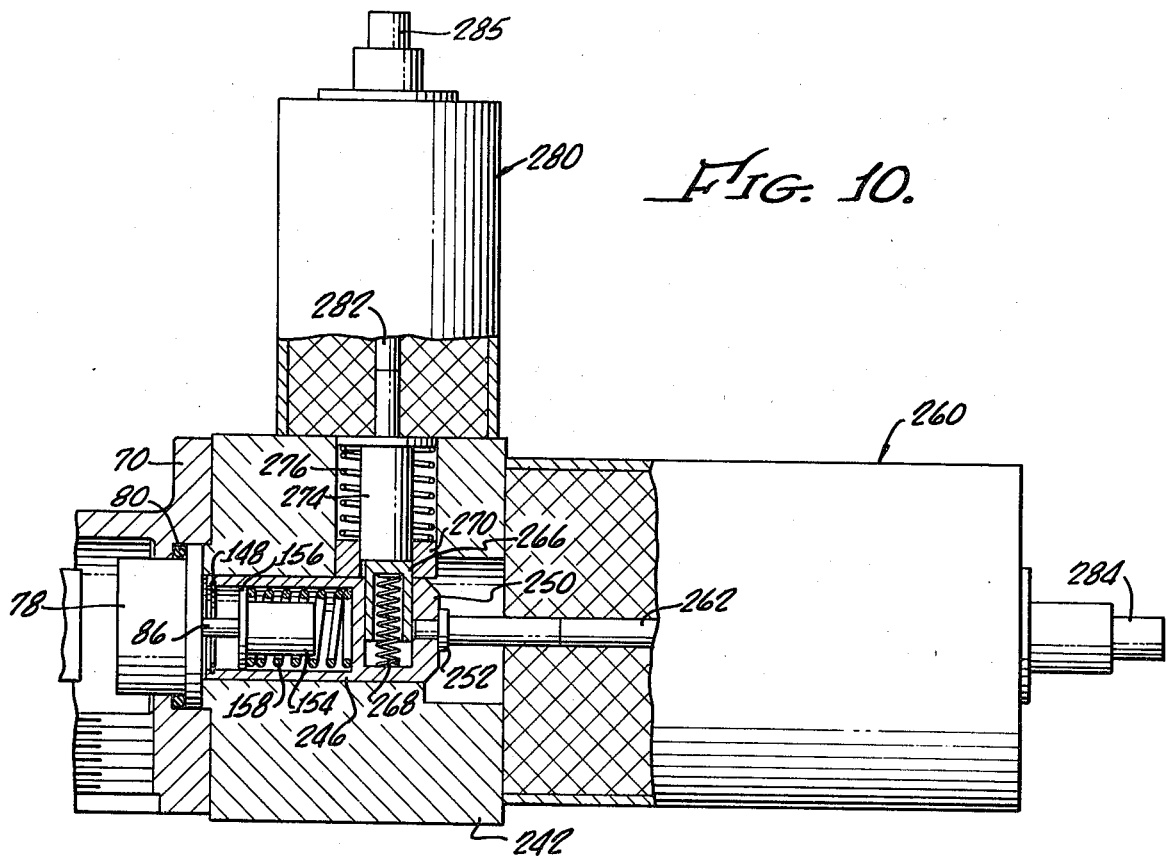
FIG. 10 shows the valve solenoids of FIG. 9 in open, latched position.

Illustrated in FIGS. 9 and 10 is a modification of the powered drive of the valve described herein. The actuator valve of this modification is identical to that described above, except for a different powered drive and a modification of the lost motion spring housing. Valve stem 86 carries an end cap 154 which is the same as corresponding part previously described. A valve operator body 242 is secured to an end of valve body 70 and slidably carries a lost motion spring housing 246 which includes an end 250 carrying a bearing plate 252. The latter is connected to be driven by the plunger 262 of a power solenoid 260 having a plunger retracting spring 261.

Mounted within the end of the lost motion spring housing 246 is a hollow latching pin 266 that is urged upwardly (outwardly of housing 246) by means of a spring 268 compressed between the interior of the pin and the housing 246. A ring 270 mounted in valve operator body 242 defines a recess capable of receiving the end of latching pin 266 when the latter, together with the housing 246, is driven toward the left (as viewed in FIG. 9) upon energization of the solenoid to drive its plunger 262 toward the left.

A piston 274, urged upwardly by means of a spring 276, is slidably mounted in the valve operator body 242 and connected to be driven downwardly against the action of the spring 276 by an unlatching solenoid 280 having a spring retracted driven plunger 282. The latter is powered downwardly upon energization of unlatching solenoid 280 to drive piston 274 downwardly and force the latching pin 266 from the recess defined by ring 270, thereby to allow the valve return spring 140 to move the valve back to closed position.

FIG. 9 illustrates the solenoid operated embodiment in valve closed position and FIG. 10 shows the solenoid operated embodiment in open position with the latching pin received in the latching recess from which it may be driven by energization of the unlatching solenoid 280.

In operation of the solenoid actuated version of the valve, an electrical pulse of approximately one second duration is applied to actuating solenoid 260 to trigger the valve to open position. Once open, it remains in open position until a second electrical pulse is transmitted to the unlatching solenoid 280, which then allows the valve to shift to closed position.

As the solenoid 260 is energized, the valve sleeve 120 moves to the left compressing return spring 140 until the valve sleeve end 124 contacts valve seat 92 at which time the lost motion spring 158 begins to compress, allowing further motion of the lost motion spring housing 246 until latching pin 266 is aligned with and is projected into the latching recess formed by ring 270.

It will be seen that the actuator valve described herein is readily adapted to various types of operation and may be changed from motorized cam operation to latching solenoid operation simply by changing the valve operator body and the operating mechanism carried thereby, and by changing the lost motion spring housing that is mounted over the end of the valve operating stem.

Like the motorized cam version, the solenoid operated embodiment of FIGS. 9 and 10 includes provision for allowing the valve to be opened or closed manually as required. Thus manually operated buttons 284 and 285 are coupled with the end of solenoid plungers 262 and 280, respectively, to achieve manual opening and unlatching of the valve. The manually operated end cap 100 shown in FIGS. 4 and 5 is utilized in both the motorized cam arrangement and the solenoid operated arrangement for manual closing of the valve when necessary.

The described valve has a number of advantages. Improved sealing against high input pressure is provided by a combination of features. Primarily, sealing is enhanced by the balanced configuration that allows little or no pressure differential due to input pressures to be exerted on the valve closure. Further, a narrow edge seal is provided by the combination of the valve sleeve edges 122, 124 and the seats 82, 92. Although O-rings are provided, these are less in number than in the conventional spool or pintle valve. Furthermore, these O-rings do not experience changes from compressed to uncompressed conditions as the O-rings relatively move in and out of or to and from relieved portions of the pintle. Thus the few O-rings that are employed will have a longer life. The illustrated configuration requires only two sliding O-ring seals and thus frictional resistance to valve closure motion is decreased because of the decreased number of sliding seals.

Although the improved valve is primarily balanced requiring a minimum force to move it to the open position even in the presence of high input pressures, it is readily provided with a selected amount of closing force caused by the input pressure itself to provide still tighter sealing at the sleeve edge.

In addition, the described valve has a large flow rate for its size. For example, a valve having a valve sleeve with a ¾ inch internal diameter can pass 1.26 gallons of water in less than one second at an input pressure of 250 pounds per square inch.

The illustrated valve is readily disassembled and parts may be easily removed and replaced as deemed necessary or desirable.

Principles of the present invention have been initially embodied in an actuator valve for an hydraulic control valve for a magazine sprinkler system and the embodiments disclosed herein have been designed for such operation. However, it will be readily appreciated that many other applications of the basic valve configuration described above may be employed. Principles of the invention are not limited to bistable valves nor to three-way valves, but may include monostable valves and two-way valves. When fitted with a progressive control of longitudinal valve sleeve position and providing inputs to both of ports 72, 74, the described valve may be employed as a mixer valve to flow separate input fluids from each of ports 72 and 74 through chambers 104 and 106 to be mixed in the common chamber 108 and thence out through output port 76. Further, if one or both of the valve seats 82 and 92, together with seat carrying retainers 78 and 90, are made axially adjustable, as by threadedly mounting these within the valve body, the valve may be employed as a mixer to control the relative proportions of two input fluids separately flowing into the respective ports 72, 74 to be combined in the outlet port 76. In such a configuration, the valve sleeve may be fixed or it too may be axially adjustable to provide greater flexibility of flow control and mixing.

All of the above described configurations exhibit the described advantages of a balanced valve in which input pressure does not exert an undesired force on the valve closure member and in which a high capacity flow rate is achieved with considerably improved sealing of the valve.

The foregoing detailed description is to be clearly understood as given by way of illustration and example only, the spirit and scope of this invention being limited solely by the appended claims.

What is claimed is:

1. A three-way valve comprising
   a valve body having first and second mutually spaced chambers, said chambers respectively having first and second external ports for fluid communication with points outside of the valve body, and respectively having first and second internal ports,
   a valve seat in each said chamber,
   a hollow spool having first and second ends extending into said first and second chambers through said first and second internal ports respectively, said spool being axially slidable in said valve body from a first position wherein said first end of the spool is relatively closer to said seat of said first chamber and said second end of said spool is relatively further from said seat of said second chamber, and a second position in which said first end of the spool is relatively further from said first seat of the first chamber and said second end of the spool is relatively closer to said second seat of said second chamber,
   said valve body having a third chamber formed therein adjacent an intermediate portion of said spool, said third chamber having an external port, said intermediate portion of said spool including port means for fluid communication between the interior of said spool and said third chamber, and means for axially shifting said spool.

2. The valve of claim 1 including a spool operator movably mounted in said valve body and having a driving connection with said spool, and means for driving said spool operator.

3. The valve of claim 2 including return spring means, and wherein said spool operator includes a spring housing slidably mounted in said valve body, lost motion spring means interposed between said valve spool and said housing, said lost motion spring means being stiffer than said return spring means.

4. The apparatus of claim 2 wherein said means for driving said spool operator comprises a motor, a shaft connected to be driven by said motor, and first cam means fixed to said shaft for driving said spool operator upon rotation of said motor.

5. The apparatus of claim 4 including switch means connected in circuit with said motor, and second cam means carried by said motor shaft for operating said switch means when said first cam means has driven said operator a predetermined distance.

6. The valve of claim 5 wherein said motor shaft comprises a first section fixed to said motor and a second section carrying said cams, and unidirectional coupling means for driving said second section in response to rotation of said first section of said motor shaft.

7. The valve of claim 6 including an auxiliary operating handle rotatably mounted in said valve body, and means for selectively coupling said operating handle with said second motor shaft section to rotate said second section without rotating said first shaft section.

8. The valve of claim 7 including means for limiting rotation of said auxiliary operating handle to a predetermined fraction of a full revolution.

9. The valve of claim 2 wherein said means for driving said spool operator comprises solenoid means for axially shifting said operator in response to an electrical signal received by said solenoid means.

10. The valve of claim 9 including means for latching said spool in said second position, and means for releasing said latching means to allow said spool to return to said first position.

11. The valve of claim 2 wherein said means for driving said spool operator includes valve actuating solenoid means connected with said valve body for axially shifting said spool operator, a spring pressed latching pin carried by said operator, a latching pin receiving recess in said valve body, and unlatching solenoid means for driving said latching pin from said recess.

12. A valve comprising
   a valve body having a chamber,
   first and second ports formed in said chamber,
   a valve seat in said chamber,
   a hollow spool having an end extending into said chamber through said second port, said spool being slidably mounted in said valve body for motion axially of said second port between a first position wherein said spool end bears upon said valve seat to block flow between said chamber and the interior of said spool, and a second position wherein said spool end is spaced from said valve seat to permit flow between said chamber and the interior of said spool,
   means for providing fluid communication between the interior of said spool and the exterior of said valve body comprising a second chamber within said valve body adjacent an intermediate portion of said spool having a third port in communication with the exterior of said valve body, and means for providing fluid communication between the interior of said spool and said second chamber, said means for providing fluid communication between the interior of said spool and said second chamber comprising fluid passages extending through said hollow spool intermediate portion.

13. A valve comprising
a valve body having a chamber,
first and second ports formed in said chamber,
a valve seat in said chamber,
a hollow spool having an end extending into said chamber through said second port, said spool being slidably mounted in said valve body for motion axially of said second port between a first position wherein said spool end bears upon said valve seat to block flow between said chamber and the interior of said spool, and a second position wherein said spool end is spaced from said valve seat to permit flow between said chamber and the interior of said spool,
means for providing fluid communication between the interior of said spool and the exterior of said valve body comprising a second chamber within said valve body having a third port in communication with the exterior of said valve body, means for providing fluid communication between the interior of said spool and said second chamber,
means for shifting said spool between said positions, said valve body including a third chamber having fourth and fifth ports therein, said spool having a second end extending through said fifth port into said third chamber, and
a second valve seat in said third chamber, said spool being axially movable relative to said fifth port between a third position in which said second spool end seals upon said second valve seat to block flow between said third chamber and the interior of said spool, and a fourth position wherein said second spool end is spaced from said second valve seat to permit flow between said third chamber and the interior of said spool, whereby shifting of said spool causes said second chamber to be in fluid communication with either of said first and third chambers or with both of said first and third chambers.

14. The valve of claim 13 wherein said fourth position of said spool is the same as said first position of said spool whereby in said first position said third and fourth ports are in fluid communication with each other via said second and third chambers and the interior of said spool, whereas flow between said first and third ports and between said first and second chambers is blocked, and wherein said second position of said spool is the same as said third position whereby in said second position said first and third ports are in fluid communication with each other through said first and second chambers and the interior of said spool whereas flow between said third and fourth ports and between said second and third chambers is blocked.

15. The valve of claim 14 wherein said first mentioned chamber circumscribes one end of said spool and wherein said one end of said spool includes an external shoulder within said chamber whereby pressure of fluid within said chamber will exert a force upon said shoulder tending to press said one end of the spool against said valve seat.

16. The valve of claim 14 including first spring means for urging said spool toward said first position, and wherein said means for shifting said spool comprises a spool operator and second spring means interposed between said spool and said operator, said second spring means being stiffer than said first spring means.

17. The valve of claim 14 wherein said means for shifting said spool comprises a motor, a cam connected to be driven by said motor, and means for driving said spool in response to rotation of said cam.

18. The valve of claim 14 wherein said means for shifting said spool comprises a valve stem fixed to said spool, a spool operator slidably mounted in said valve body, lost motion spring means interposed between said spool operator and said valve stem, and return spring means for urging said spool toward said first position, said lost motion spring being stiffer than said return spring means.

19. The valve of claim 18 including a cam connected to drive said operator, a motor connected to drive said cam, and switch means responsive to a predetermined amount of rotation of said motor for disabling said motor.

20. The valve of claim 19 including means for resetting said cam to an initial position, and condition responsive means for initiating operation of said motor.

21. The valve of claim 18 including valve actuating solenoid means connected with said valve body for axially shifting said spool operator, a spring pressed latching pin carried by said operator, a latching pin receiving recess in said valve body, and unlatching solenoid means for driving said latching pin from said recess.

22. A valve comprising
a valve body having a chamber with first and second ports, and means for selectively sealing said second port, said means comprising
a valve seat in said chamber,
a hollow sleeve mounted in sealed sliding relation in said second port, said sleeve having an end within said chamber constructed and arranged to selectively seat and seal upon said valve seat,
means for longitudinally shifting said sleeve relative to said valve seat, said valve body including a second chamber having third and fourth ports, said sleeve extending into said second chamber through said third port in slidable sealed relation to said third port, means for providing fluid communication between said second chamber and the interior of said sleeve,
said second chamber having a fifth port, said body including a third chamber having sixth and seventh ports, said sleeve extending into said third chamber through said fifth and sixth ports in slidable sealed relation thereto, a second valve seat in said third chamber, the other end of said sleeve being positioned within said third chamber and constructed and arranged to selectively seat and seal upon said second valve seat.

23. The valve of claim 22 wherein said means for shifting said sleeve includes means for resiliently pressing said sleeve toward said second valve seat.

* * * * *